March 21, 1939.  R. R. EASTIN  2,151,376
TRANSMISSION MECHANISM
Filed March 31, 1936  4 Sheets-Sheet 1
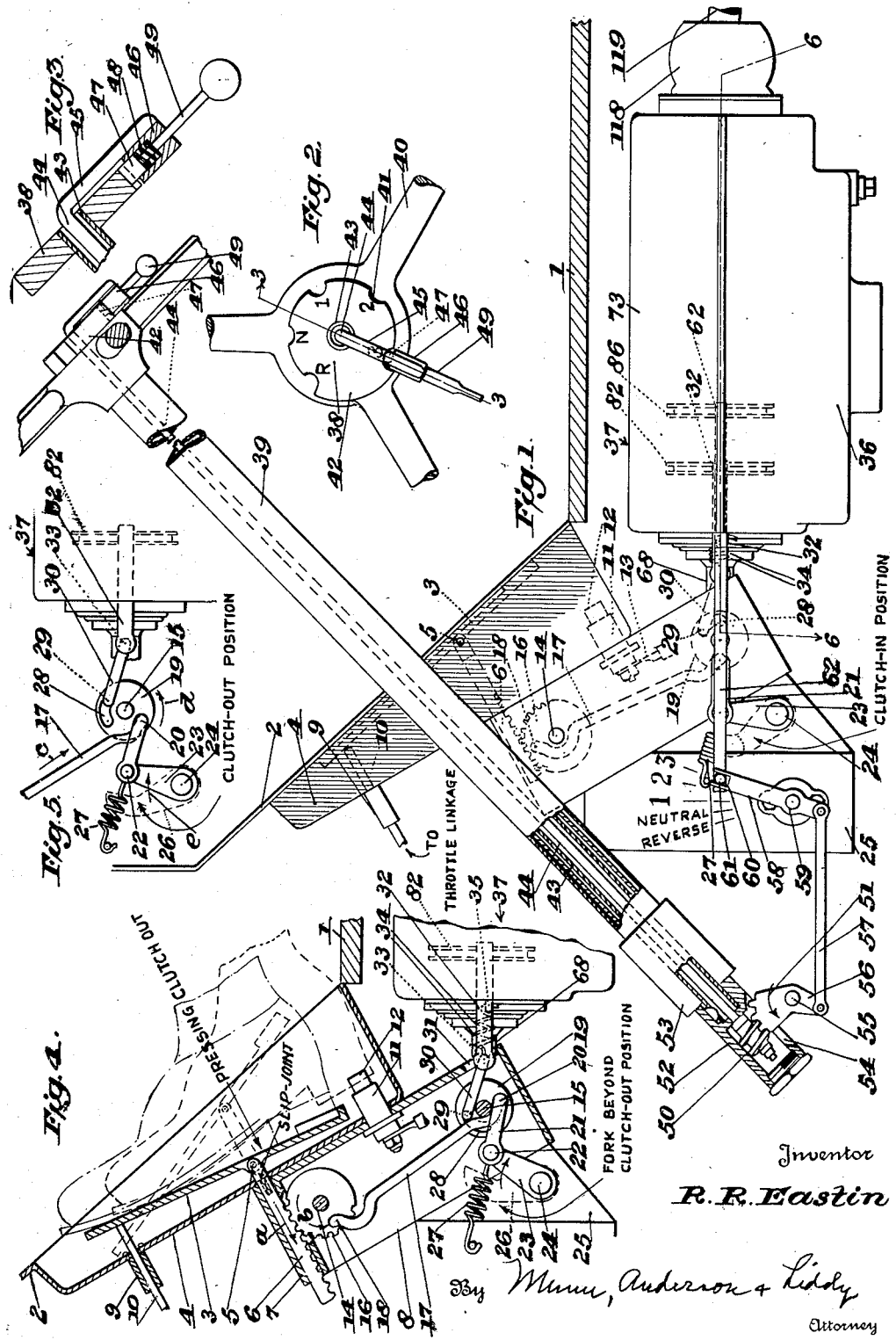
Inventor
R. R. Eastin
By Munn, Anderson & Liddy
Attorney

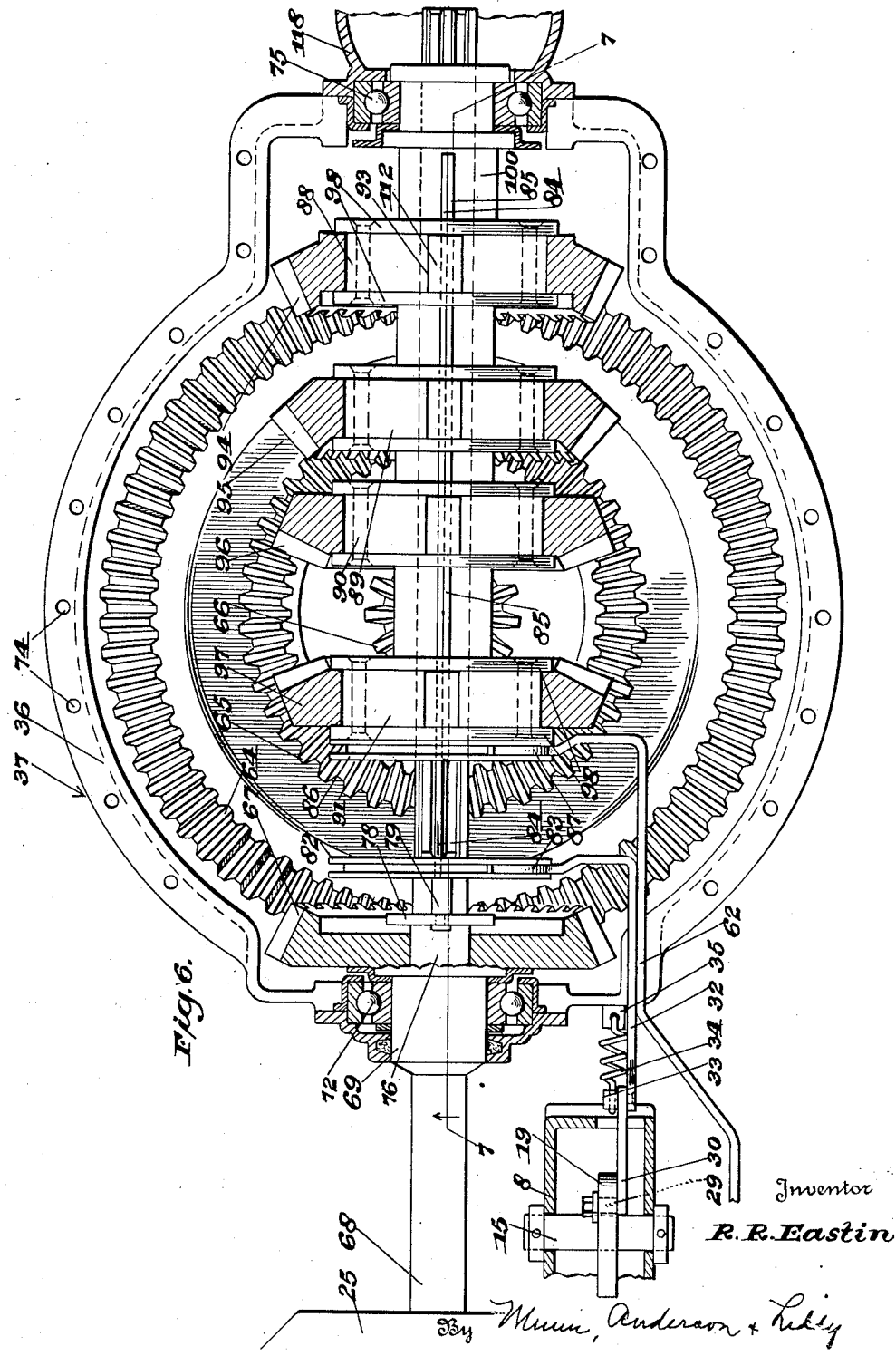

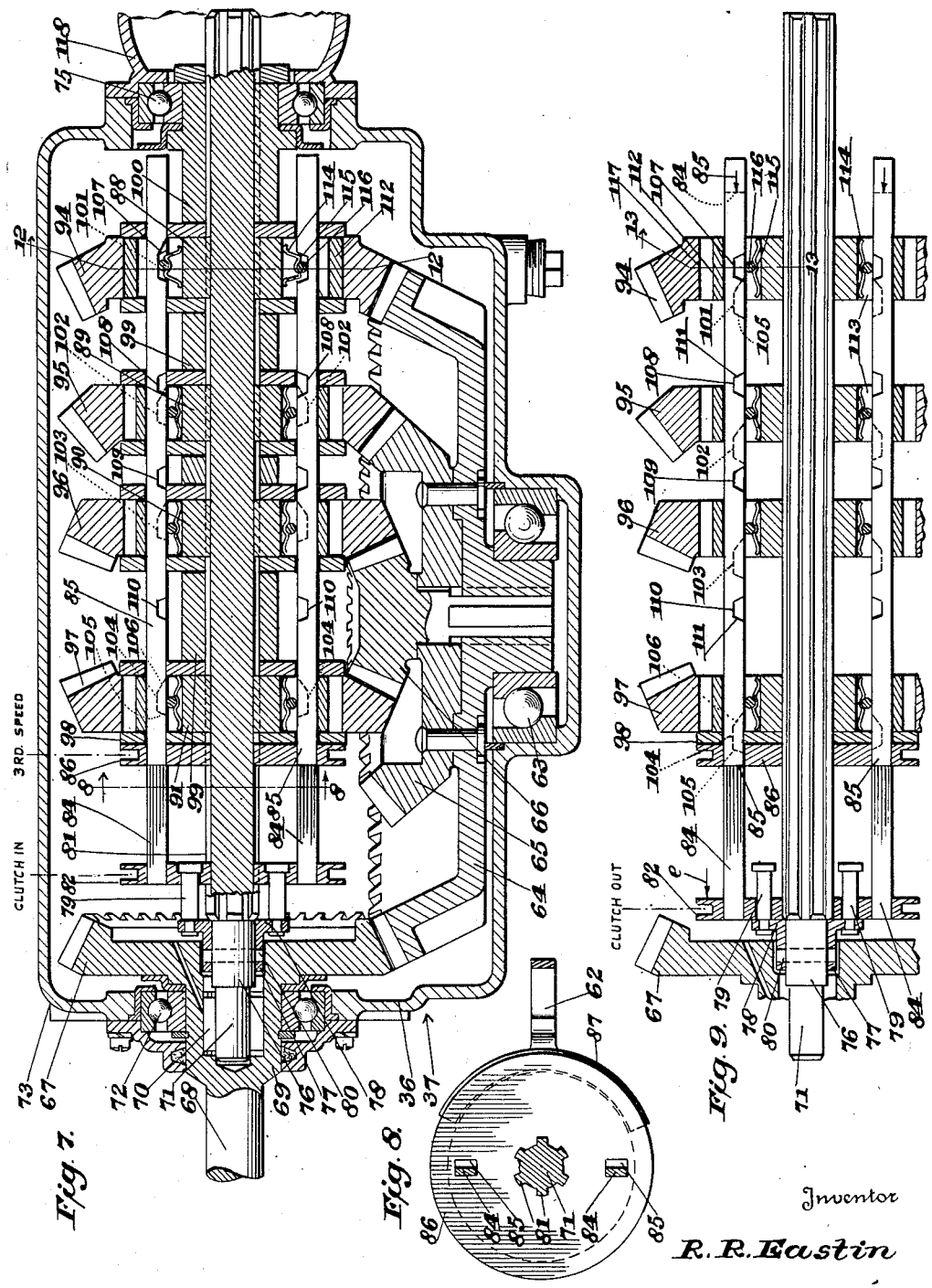

March 21, 1939. R. R. EASTIN 2,151,376
TRANSMISSION MECHANISM
Filed March 31, 1936 4 Sheets-Sheet 4
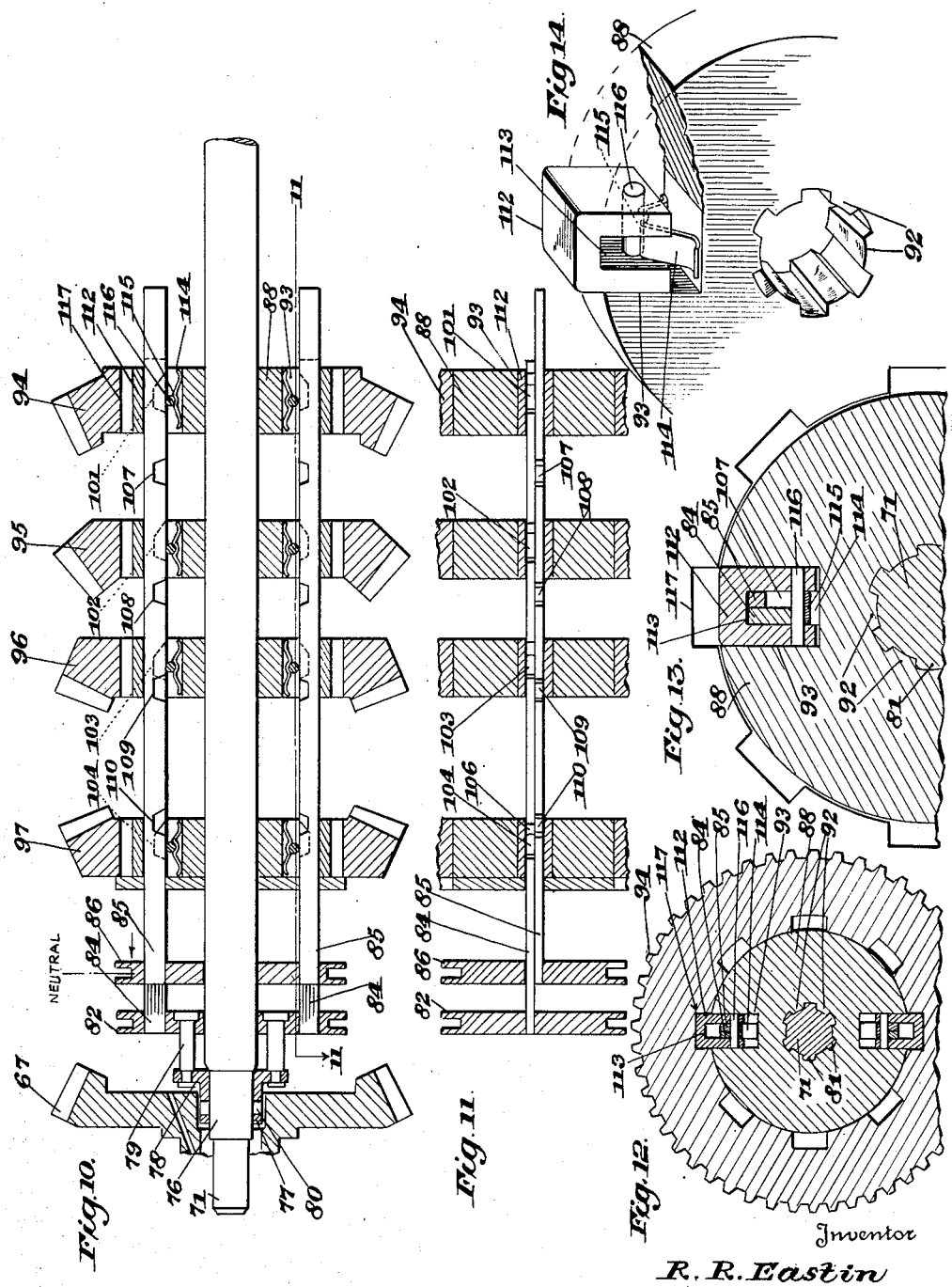
Inventor
R. R. Eastin
By Munn, Anderson & Liddy
Attorney Patented Mar. 21, 1939

2,151,376

UNITED STATES PATENT OFFICE 2,151,376

TRANSMISSION MECHANISM

Rollie R. Eastin, Port Huron, Mich., assignor of five per cent to Jesse C. Castator and Loretta Castator, ten per cent to Walter Burns, ten per cent to Robert A. Gray, Jr., ten per cent to William Burns, and fourteen per cent to Reginald Smith, all of Port Huron, Mich.

Application March 31, 1936, Serial No. 71,915

8 Claims. (Cl. 74—334)

This invention relates to improvements in transmission mechanisms, and its objects are as follows.

First, to provide a transmission mechanism which is semi-automatic in its operation; the depression of the clutch pedal and resulting disengagement of the clutch unlocking all of the change gears, the subsequent release of the clutch pedal locking that one of the change gears which was selected at the steering wheel in the time between the two manipulations of the clutch pedal.

Second, to arrange the clutch pedal in such a manner as to disengage the clutch before the next change gear can be selected at the steering wheel, and to cause the selected change gear to be locked with the driven shaft before the clutch is reengaged.

Third, to provide recesses or pockets in the floor-board of the automobile or other vehicle for the clutch and brake pedals, so that the latter will be substantially flush with the floor-board for the two important purposes of enabling the driver to readily slide his feet on to the pedals, and to simultaneously disengage the clutch and apply the brakes with substantially the same action as he would use in bracing himself in trying to avoid an obstacle in the path of the car.

Other objects and advantages will appear in the following specification, reference being had to the accompanying drawings in which:

Figure 1 is a combined sectional and elevational view of structure involved in the invention.

Figure 2 is a plan view of a fraction of the steering wheel, especially showing the shifter dial and lever.

Figure 3 is a cross section taken on the line 3—3 of Fig. 2.

Figure 4 is a sectional view of the combined clutch and accelerator pedal together with related mechanism.

Figure 5 is a detail view showing the "clutch out" position of the foregoing mechanism.

Figure 6 is a horizontal section of the transmission mechanism taken on the line 6—6 of Fig. 1.

Figure 7 is a vertical longitudinal section taken on the line 7—7 of Fig. 6.

Figure 8 is a detail cross section taken on the line 8—8 of Fig. 7.

Figure 9 is a sectional diagram illustrating the position of the shifter bars when the clutch is out.

Figure 10 is a sectional diagram illustrating the gear release bars in the neutral position.

Figure 11 is a horizontal section taken on the line 11—11 of Fig. 10, showing one set of the shifter and gear release bars.

Figure 12 is a cross section taken on the line 12—12 of Fig. 7.

Figure 13 is a cross section taken on the line 13—13 of Fig. 9.

Figure 14 is a detail sectional perspective view of one of the gear centers and one of its movable keys.

The respective transmission mechanism and combined control of accelerator, clutch and transmission are made the separate subjects of divisional applications filed by Rollie R. Eastin Nov. 3, 1936, Serial Nos. 109,047 and 109,048.

Reference is first made to Fig. 1. The floor 1 of the automobile or other vehicle in which the improved transmission is installed, slopes upwardly in the driver's compartment, as is common. The foot-board, as the sloping place is herein referred to, now comprises a metal plate 2 which is recessed at two places to accommodate the clutch and brake pedals. Only the clutch pedal 3 is shown (Fig. 4). The recess or pocket in which this works is designated 4. The clutch pedal is substantially flush with the footboard 2 when in its idle position (Fig. 1), so that the driver can readily slip his foot on to it preparatory to pressing it down. When the pedal 3 is depressed (Fig. 4) the sides of the pocket form a guard which prevents the driver's foot from slipping off.

A pivot pin 5 (Fig. 4) provides a turning connection between the clutch pedal 3 and a rack bar 6. This rack bar is movable up and down in the guide 7 of a casing 8 which is appropriately affixed to a member of the car. A slip-joint in the rack bar enables the removal of the pedal when it is desired to lift the foot-board. The casing 8 has a bushing 9 attached to it for the guidance of a rod 10 which projects into the pocket at one end, its other end extending off to the linkage of the carburetor. The rod and linkage are herein identified as the accelerator and it is plain from Fig. 4 that the pedal 3 controls both the accelerator and the rack bar 6, the latter being identified with the clutch as is brought out below. The casing 11 of the starter button 12 is fixed in the contacting parts of the pocket 4 and casing 8, the button 12 being within reach of the heel of the driver's foot, the only requirement being for him to slip his foot back from the full line to the dotted line position in order to depress the starter button. The wire 13 leads off to one side of the starter circuit, as is common.

A pair of shafts 14, 15 is appropriately journaled on the sides of the casing 8. The top shaft 14 carries a gear 16, which may be fractional as shown, in mesh with the rack bar 6. A depression of the clutch pedal 3 moves the bar 6 downwardly in the direction of arrow *a* and turns the gear 16 counterclockwise in the direction of arrow *b*.

A link 17 is pivotally connected to the gear 16 at 18 and extends to a disk 19 on the bottom shaft, to which disk the link is pivoted at 20 in common with another link 21 that extends across to where it is pivotally connected at 22 to an arm 23. This arm is secured to one end of the clutch fork shaft 24. This shaft is journaled on the clutch housing 25 and one end of it projects from the housing to receive the arm.

On the inside of the housing 25 the shaft 24 carries a clutch fork 26. The operation here proceeds on such an order that when the clutch pedal 3 is depressed (Fig. 4) the linkage described moves in the direction of the arrows *c* and *d* (Fig. 5), turning the arm 23 in the direction of arrow *e* and causing the clutch fork 26 to displace the clutch into a clutch out position, as indicated in Fig. 5. A strong spring 27, anchored at one end to the housing 25 (Fig. 4) and connected at the other end to the pivot 22, tends to resist the movements in the directions of the arrows (Fig. 5) and aids in restoring the parts to an original position when foot pressure on the clutch pedal 3 is relaxed.

A slot 28 in the disk 19 contains the stud 29 (Fig. 6) of a link 30 which extends rearwardly through an opening 31 in the casing 8 to a place of pivotal connection with the transmission release bar 32. Said pivotal connection comprises a stud 33 which is riveted to the bar 32. It provides an anchorage for one end of a spring 34, the opposite end of which is attached to a lug 35 on the bottom portion 36 of the transmission housing 37.

The purpose of the slot 28, which is arcuate as shown, is to allow an initial movement of the linkage 17, 21 and arm 23 before the link 30 is affected. The stud 29 initially occupies a position at the upper end of the slot 28 (Fig. 1). Depression of the clutch pedal 3 advances the slot 28 with respect to the stud 29 (Fig. 5). The engagement of the lower end of the slot with the stud marks the beginning of a pull on the link 30 upon further depression of the clutch pedal. In the meantime the fork 26 disengages the clutch.

Before tracing the transmission release bar 32 into the housing 37, attention is directed to the shifting mechanism which is herein substituted for the conventional gear shift lever which commonly juts up through the floor 1. A dial 38 (Fig. 2) is affixed to the upper end of a rigid tube 43 extending through the steering column 39 and beyond the steering wheel 40. The dial does not impede the turning of the steering wheel which it surmounts as shown. The former has five peripheral depressions 41 marked 3, 2, 1, N, R as shown, indicating third, second and first speeds, neutral and reverse. The dial 38 is enlarged at 42 so as to provide stops adjacent to the depressions for 3 and N.

A rod 44 extending up through the tube 43 (Fig. 1) is bent into an end 45 (Fig. 3) to which a barrel 46 is attached. This barrel has a recess that confronts the periphery of the dial 38. A latch 47, pressed outwardly by a spring 48, is part of a finger piece 49 which is actuated by the driver when he selects the various speeds indicated on the dial. The bent end 45 and finger piece 49 comprises the present substitute for the former gear shift lever, but because of the diminutive size of the gear shift lever 45, 49 it appears as nothing more than an ordinary throttle lever, being less in extent than the radial distance of the steering wheel.

The lower end of the shift rod 44 carries a worm gear 50 (Fig. 1) in permanent mesh with a gear quadrant 51. The gear 50 is confined in a suitable housing 52 occurring below the usual steering cam and lever housing 53 and the housing 52 is slotted at 54 to admit the quadrant 51. The latter is journaled on a shaft 55. It has an arm 56 to which one end of a link 57 is pivotally connected. The other end of the link is pivotally connected to a rocker 58 which is mounted on an appropriate bracket 59 which is fixed to the side of clutch housing 25. At its upper end the rocker 58 is forked at 60 to contain the stud 61 of the shifting bar 62. This bar, like the transmission release bar 32, extends into the transmission housing 37 (Fig. 6).

This housing contains a step bearing 63 (Fig. 7) which supports the largest of three transmission drive gears 64, 65 and 66. These gears are permanently connected and revolve continuously as a unit as long as the clutch is engaged. Driving power for this unit is derived from a large pinion 67 which is either made integral with the drive shaft 68, as shown, (Fig. 7) or fixedly connected to it. The drive shaft 68 extends forwardly into the clutch housing 25 (Fig. 1) where it is subject to the clutch as already pointed out.

It is preferable to make the pinion 67 integral with the shaft 68 because this more readily enables the construction of a hub 69 (Fig. 7) to contain the roller bearings 70 at one end of the driven shaft 71. A roller bearing 72 supports the hub 69, this bearing being carried by the transmission housing. The latter includes a cover 73, and when the cover is secured in place, as indicated at 74 in Fig. 6, the bearing 72, as well as a roller bearing 75 at the opposite end of the transmission housing, are held in position. The latter bearing is a complement to the roller bearing 70, inasmuch as it supports the right and remaining end of the driven shaft 71.

An enlargement 76 (Fig. 7) of the driven shaft 71 provides a mount for the sleeve 77 of a circular flange 78 which has two or more headed guide studs 79 firmly secured to it so as to project rearwardly or in parallelism to each other, and to the driven shaft 71. The sleeve 77 is secured to the mount 76 by a cross pin 80. Most of the driven shaft is longitudinally fluted at 81 to provide splines for an assemblage of disks, collars and gear centers.

The first disk 82 is the transmission release disk. This has an annular groove to contain the forked end 83 of the transmission release bar 32 (Fig. 6). The operation of this bar upon operation of the clutch pedal 3 will shift the disk 82 between the positions in Figs. 7 and 9. This disk has only two positions; either the clutch in position (Fig. 7) or the clutch out position (Fig. 9). Said disk is mounted on the studs 79 which provide its guidance as the disk is moved between its positions.

Each of a pair of gear release bars 84 is permanently secured at its left end in the disk 82

(Fig. 7). These bars are diametrically opposite to each other, and they lie flat against a pair of shifter bars 85 which begin at a shifter disk 86.

The latter disk is annularly grooved to contain the fork 87 (Fig. 6) of the shifting bar 62. When the shifting bar 62 is moved by operation of the shifting lever 45, 49 (Fig. 3) the disk 86 will take any of the five possible positions. Its range of movement is between the position shown in Fig. 7 and a position directly beside the disk 82. The heads of the studs 79 act as limiting means, stopping the disk 86 when moved into the position stated.

Gear centers 88, 89, 90 and 91 are fixed upon the splines of the driven shaft 71 (Figs. 12 and 13). For this purpose each gear center has a splined hole 92 (Fig. 14). Each disk is peripherally smooth-faced with the exception of key recesses 93 at diametrically opposite points (Fig. 12). The respective gear centers carry the following gears, the third speed gear 94, second speed gear 95, first speed gear 96 and reverse gear 97.

Each gear center carries one of the gears. The latter are in the nature of ring gears with central openings large enough to contain the gear centers with a turning fit. The gear centers and gears are thus arranged in sets, and they are kept that way by facing plates 98 which are riveted on opposite sides of each center. Confronting facing plates 98 are spaced apart by collars 99. The last collar 100 of the series of four (Fig. 7) carries the internal part of the bearing 75, and it is thus by means of the terminal collar 100 that the driven shaft 71 has bearing support at its right end.

Consider the details of the gear release bars 84. Each bar extends from the disk 82 through the disk 86, all of the gear centers and all of the facing plates projecting a considerable distance beyond the last of the latter, as plainly shown in Fig. 7. Each gear release bar has notches on its inner side, these reading in the order of the gears being designated 101, 102, 103, and 104. The notches in the two bars are in confronting relationship. Each notch is rather long, having an abrupt left end 105 and a long incline 106 at its right end.

The shifter bars 85 also have notches on their inner sides which, reading in the order of the gears, are designated 107, 108, 109 and 110. Both ends of each of these notches are abrupt as at 111. The notches are adapted to be brought into registration by a release of the clutch pedal 3 and a resulting movement of the release disk 82 (Fig. 7) to the clutch in position.

Because of the fact that each of the change gears is alike in construction, the following description is applied to the 3-speed gear 94, the same reference characters being applied to corresponding parts of the other change gears. The center 88 of this gear contains a key 112 in each of its recesses 93 (Figs. 12 and 14). These keys are in the form of a U so as to provide an internal spring and bar space 113. A heavy leaf spring 114 extends into the respective space, its free ends resting on the bottom of the recess, and the crotch 115 in its mid portion constantly bearing against a cross pin 116 in the key because of the spring tension.

The gear release and shifter bars 84, 85 occupy the space 113 constantly, the keys 112 being radially movable with respect thereto, first inwardly of the recesses 93 in the gear center then outwardly into any diametrical pair of recesses 117 in the change or ring gear 94 so as to lock the gear and its center together. The keys 112 then occupy both sets of recesses in the gear and its center, bridging the dividing line between to do the locking as shown in Fig. 12.

A further and the chief purpose of the cross pins 116 is to cooperate with the notches 101, etc., 107 etc. in the bars 84, 85. When these notches are brought into registration by a relative shifting of the bars (Fig. 7) the springs 114 press the keys 112 into the recesses 117 because of the room that the matched bar-recesses affords. Later, when the bars 84 are shifted relatively to the bars 85 (Fig. 9) to the clutch out position the movement of inclines 106 across the pins 116 move the latter inwardly to retract the keys 112 from the recesses 117. This releases the rotating gear 94 from its center 88, leaving the latter and the driven shaft 71 idle until the next gear shift.

At this point it should be explained that the right end of the driven shaft 71 is coupled with the universal joint (not shown) which imparts motion to the impeller shaft that goes to the differential gear in back. The universal joint is contained by the housing 118 (Figs. 1 and 7). The propeller shaft is indicated 119 in Fig. 1.

The operation is readily understood. The inactive or clutch in position of the clutch pedal 3 (Fig. 1) occurs when there is no foot pressure upon it. Then it extends in the pocket 4 to the substantially flush position with the foot board 2. The spring 27 (Fig. 4) acting on the linkage does the extending, but this is aided by the spring 34 (Figs. 1 and 6) which is the stronger, and necessarily so because of its duty to draw the release disk 82 into the clutch in position (Fig. 7).

Considering Figs. 1, 6 and 7 as they stand, the transmission mechanism is assumed to be operating at 3rd, or high speed. The 3-speed gear 94 is locked to its center 88 by the keys 112 (Fig. 12). Consequently the shaft 71 is driven at engine speed, the large gear 64 acting as an idler intermediately of the pinion 67 and gear 94. As yet it is not possible to move the shifting lever 45, 49 (Fig. 3) from the 3rd speed position (Fig. 2) because the abrupt ends 111 of the notches 107 in the shifter bars 85 now occupied by the cross pins 116 (Fig. 7) offer an obstruction to more than a slight movement of said bars toward the left, corresponding to a slight counterclockwise turn of the shifting lever (Fig. 2).

Assume it to be desired to shift the transmission mechanism into neutral. The clutch pedal 3 is pressed down (Fig. 4). The clutch is disengaged by the resulting movements of the rack bar 6 and gear 16 in the directions of arrows a and b. These movements traced through the links 17, 21 to the arm 23 move the clutch fork 26 to the clutch out position (Fig. 5). The first part of movement in the foregoing linkage is idle as far as the transmission mechanism is concerned. The slot 28 in the disk 19 provides for this, but when the right end of the slot catches up with the stud 29 on the link 30 (Fig. 5) a further depression of the pedal 3 displaces the fork 26 beyond the clutch out position but also pulls the release bar 32 (Fig. 6) toward the left, displacing the disk 82 from the clutch in position (Fig. 7) to the clutch out position (Fig. 9) as indicated by the arrow e.

This displacement of the disk 82 carries the attached gear release bars 84 to the left. These bars are the ones that have the notches 101 to 104. The long inclines 106 of the notches 101 ride over the cross pins 116, retracting the keys 112 from the recesses 117 in the 3-speed gear 94 against the tension of the springs 114. The gear 94 continues to revolve but its center 88 and the driven shaft 71 become dormant because of their release.

Turn the shifting lever 45, 49 counterclockwise to neutral. Foot-pressure is still maintained on the pedal 3 (Fig. 4) and the clutch remains disengaged as the consequence. With the clutch disengaged the shifting lever 45, 49 could be turned elsewhere on the dial 38 because selection of any of the five speeds (including neutral and reverse as a speed for convenience) is now perfectly free. The movement of the shifting lever to the neutral position turns the rocker 58 (Fig. 1) counterclockwise. The resulting pull on the shifting bar 62 (Fig. 6) moves the shifter disk 86 from the 3-speed position (Fig. 7) to the neutral position (Fig. 10). All of the notches 107 to 110 in the shifter bars 85 are now out of range of all of the cross pins 116. Consequently it is not possible for the springs 114 to move any of the keys 112 into locking engagement with any of the gears 94 to 97. This condition is not changed should the operator release the clutch pedal 3 and reengage the clutch.

Assume that it is next desired to shift into first speed. It is desirable to again depress the clutch pedal 3 so as to disengage the clutch. This enables letting the clutch in gradually and then accelerating by a toe-pressure on the rod 10. But the selection could be made and the 1-speed gear 96 (Fig. 7) locked in by simply moving the lever 45, 49 from neutral to first speed. The notches 109 would then be placed over the pins 116 of that gear and since they would then register with the notches 103 already in place the keys 112 would snap into engagement and thus lock the gear 96 to its center 90. But it is preferable to disengage the clutch first and then go through the above performance of selection.

It is to be noted by comparing Figs. 7 and 9 that the notches 101, etc. in the gear release bars 84 are at uniform distances from the cross pins 116. All of these notches take positions over the cross pins when the disk 82 is in the clutch in position (Fig. 7), and all of the same notches are displaced an even distance to one side of the cross pins when said disk is in the clutch out position (Fig. 9). But the notches 107 etc., in the shifter bars 85 are progressively farther away from the cross pins 116 of the sets of keys 112 which they control. This is necessary because of the progressive adjustment of the shifter disk 86 in response to the speed selection at the dial 38.

The previously assumed selection of first speed is regarded as occurring at a standing position of the automobile. The depression of the clutch pedal 3 (Fig. 4) pulls back the gear release bars 84 (Fig. 9) and automatically unlocks all change gears in the transmission. The driven shaft 71 and its carried gear centers are idle because the automobile is as yet not in motion. Nor is the gear set 64, 65, 66 in motion as long as the clutch pedal is held to the clutch-out position.

After the gear selection has been made at the dial 38 the release of the clutch pedal 3 allows the bars 84 to return to their former positions (Fig. 7) and the selected gear (the first speed gear) to be locked to the driven shaft 71 which is then revolved from the triple gear set at the proper ratio.

After the automobile is once set in motion the driven shaft 71 and its carried gear centers will revolve due to the momentum of the automobile even when the pedal 3 is pressed to the clutch-out position. A gear selection at the shifting mechanism on the steering wheel 40 will project the keys 112 into the selected gear, for example the second speed gear, which is then preliminarily set in motion by the revolving driven shaft. When the pedal 3 is released to assume the clutch-in position the driving power of the engine is applied through the triple gear set and the automobile moves on until the next speed change is made. In all instances only the selected gear can be locked as described, the others being held from locking by the shifter bars 85.

In some instances springs 114 under the keys 112 may not be required. For instance when it is considered that the driven shaft 71 will revolve at a considerable rate, due to the momentum of the car, the centrifugal action on the keys because of the rotation of the gear centers would be sufficient to engage the keys with the ring gear recesses. However, the springs are shown throughout because they are preferred in all change gears. A further purpose of them is to keep the bars 84, 85 under tension.

I claim:

1. The combination with a drive shaft adapted to be clutched to a source of power, of a clutch fork, a transmission mechanism having a gear set which is driven constantly from the drive shaft while the fork is in a clutch engaging position, and having a driven shaft with a plurality of speed-change gears thereon, a clutch pedal, a linkage between said pedal and clutch fork for the operation of the clutch, shifting mechanism adapted to be operated to select the wanted gear when the pedal is depressed to move the fork to a clutch disengaging position, and means positively connected to said linkage first to render all of the speed gears loose on the driven shaft when the clutch pedal is depressed, second to cause automatic locking of only the selected gear to the driven shaft when the clutch pedal is released.

2. The combination with a drive shaft adapted to be clutched to a source of power, of a clutch fork, a transmission mechanism having a driven shaft and a plurality of speed-change gears, means by which said gears are driven constantly from the drive shaft while the fork is in the clutch engaging position, means movable into position preparatory to select one of the gears to rotate the driven shaft, a clutch pedal and linkage between said pedal and clutch fork for the operation of the clutch, means actuated by said linkage to match said selecting means in position upon a release of the pedal to move the fork into the clutch engaging position, and spring-actuated locking means then taking a locking position between the selected gear and the driven shaft because of the matching positions of said selecting and actuated means to lock the selected gear to the driven shaft.

3. Transmission mechanism having a driven shaft and a plurality of speed-change gears adapted to be loose with respect to the shaft, gear centers on which the respective gears are revoluble, each gear center being splined onto the shaft in fixed position in reference to its gear, spring-actuated locking means normally embodied in each gear center, shifting means terminating in selecting means which goes through between the gears and gear centers and adapted to be set in a predetermined position for the selection of a wanted gear for driving said shaft, clutch operating means terminating in similar selecting means which also goes through between the gears and gear center, being set in position to match the first-named selecting means when said clutch operating means assumes a clutch-in position, the locking means of the selected gear then being subject to spring actuation to couple said gear with the respective gear center because of the matching of the selecting means, and means to drive the selected gear from a source of power controlled by the clutch.

4. Transmission mechanism having a driven shaft and a plurality of speed-change gears, a gear center fixed on the shaft within the confines of each gear, spring-actuated locking means carried by each center also within the confines of and in readiness to engage the respective gear, a shifter bar going through between the gear centers and gears and which has means that enables any single locking means to engage, a release bar also going through between the gear centers and gears and which has similar means for the same purpose, shifting means which is manually operative to set the shifter bar in that position which will make its means ready to lock the wanted gear to the shaft, driving means for the gears subject to a clutch, and clutch operating means having connection with the release bar, said means moving said bar to a matching position with the shifter bar to enable the selected locking means to effect its engagement with the wanted gear when the clutch operating means assumes the clutch-in position and moving said bar to a nonmatching position with the shifter bar to neutralize the wanted and all other gears when the clutch operating means assumes the clutch-out position.

5. Transmission mechanism having a driven shaft and a plurality of driven speed-change gears, a gear center fixed on the shaft for each gear, locking means carried by each gear center, a pair of bars extending along the shaft and revoluble therewith, each bar having notches, shifting means for moving one of the bars for a gear selection, and means responsive to clutch operating means for moving the other bar, thereby to match one pair of notches to let the respective locking means lock the selected gear to the respective gear center.

6. Transmission mechanism having a driven shaft and a plurality of driven speed-change gears, a gear center fixed on the shaft for each gear, a pair of disks slidable on the shaft and revoluble therewith, a pair of bars extending along the shaft, each fixed to one of the disks, each bar having notches, shifting means for sliding one of the disks and its bar for a gear selection, and means responsive to clutch operating means for sliding the other disk and its bar thereby to match one pair of notches to let the respective locking means lock the selected gear to the respective gear center.

7. Transmission mechanism having a driven shaft and a plurality of driven speed-change gears, a gear center fixed on the shaft for each gear, locking means carried by each gear center, a pair of bars extending along the shaft and revoluble therewith, one bar having notches adapted either to register with the locking means or to be spaced even distances from the locking means, the other bar having notches of which only one is registrable with a locking means at a time the remaining notches being variously spaced from the other locking means, means to shift said other bar so that one of its notches registers with the locking means of a wanted gear, and means responsive to clutch operating means for shifting said one bar to register all of its notches with all of the locking means when the clutch operating means assumes a clutch-in position, only the matching notches being effective to enable the respective locking means to act on the respective gear center and gear.

8. The combination with a drive shaft adapted to be clutched to a source of power, of a transmission mechanism having a gear set which is driven constantly from the drive shaft while the clutch is engaged, and having a driven shaft with a plurality of speed-change gears loose thereon, locking means between each speed-change gear and the driven shaft, means constantly under tension to lock the respective gear and driven shaft together, separate means which have elements that are adapted to register with respect to a selected gear, a clutch pedal and linkage between said pedal and clutch for the operation of the clutch, selecting means capable of operation when the pedal is depressed to disengage the clutch, and means positively connecting the respective separate means to the respective linkage and selecting means to register said elements as and when the clutch pedal is released to reengage the clutch after the gear selection is made, thereby to let the tension means snap the locking means into locking engagement with the registered elements.

ROLLIE R. EASTIN.